US012525245B2

(12) United States Patent
Shayne et al.

(10) Patent No.: US 12,525,245 B2
(45) Date of Patent: Jan. 13, 2026

(54) AUDIO RECORDING OBFUSCATION

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 497 days.

(21) Appl. No.: 18/101,257

(22) Filed: Jan. 25, 2023

(65) Prior Publication Data

US 2023/0245663 A1     Aug. 3, 2023

Related U.S. Application Data

(60) Provisional application No. 63/304,744, filed on Jan. 31, 2022.

(51) Int. Cl.
| | |
|---|---|
| *G10L 17/22* | (2013.01) |
| *G06F 21/62* | (2013.01) |
| *G06F 21/83* | (2013.01) |
| *G06V 20/40* | (2022.01) |
| *G06V 20/52* | (2022.01) |
| *G06V 40/16* | (2022.01) |

(Continued)

(52) U.S. Cl.
CPC .......... *G10L 17/22* (2013.01); *G06F 21/6254* (2013.01); *G06F 21/83* (2013.01); *G06V 20/41* (2022.01); *G06V 20/46* (2022.01); *G06V 20/52* (2022.01); *G06V 40/166* (2022.01); *G06V 40/171* (2022.01); *G06V 40/20* (2022.01); *G10L 17/06* (2013.01); *G06V 40/172* (2022.01); *G10L 17/00* (2013.01)

(58) Field of Classification Search
CPC ......... G10L 17/22; G10L 17/06; G10L 17/00; G06F 21/6254; G06F 21/83; G06V 20/41; G06V 20/46; G06V 20/52; G06V 40/166; G06V 40/171; G06V 40/20; G06V 40/172
USPC .......................................................... 704/273
See application file for complete search history.

(56) References Cited

U.S. PATENT DOCUMENTS 10,798,313 B2 * 10/2020 Hutz .......................... G06T 7/73
11,032,491 B2 * 6/2021 Hutz ................. G06F 18/24143
(Continued)

FOREIGN PATENT DOCUMENTS

WO    WO-2014040175 A1 * 3/2014 ........... A61B 5/0006

*Primary Examiner* — Edwin S Leland, III
(74) *Attorney, Agent, or Firm* — Fish & Richardson P.C.

(57) ABSTRACT

Methods, systems, and apparatus, including computer programs encoded on computer storage media, for selectively obfuscating audio. One of the methods includes detecting, by a security system for a premises, that a person who was within a threshold area for the premises was likely uttering a sound; determining, using data from one or more sensors, a likelihood that the person was communicating with the security system at the premises; determining whether the likelihood satisfies a threshold likelihood and that the person's voice should not be obfuscated; and in response to determining whether the likelihood satisfies the threshold likelihood and that the person's voice should not be obfuscated, selectively obfuscating the person's voice or maintaining, in memory, an audio signal i) that encodes the person's voice and ii) was captured by a microphone that was physically located at the premises.

20 Claims, 4 Drawing Sheets

(51) Int. Cl.
    *G06V 40/20*     (2022.01)
    *G10L 17/06*     (2013.01)
    *G10L 17/00*     (2013.01)

(56) References Cited

U.S. PATENT DOCUMENTS

| | | | |
|---|---|---|---|
| 11,064,166 B2* | 7/2021 | Trundle | H04N 5/272 |
| 2013/0196292 A1* | 8/2013 | Brennen | G09B 19/06 |
| | | | 434/156 |
| 2016/0182435 A1* | 6/2016 | Landqvist | H04L 51/52 |
| | | | 709/204 |
| 2016/0234356 A1* | 8/2016 | Thomas | H04K 3/84 |
| 2017/0017782 A1* | 1/2017 | Roos | H04K 1/00 |
| 2019/0113973 A1* | 4/2019 | Coleman | G16H 50/70 |
| 2020/0387995 A1* | 12/2020 | Bucciarelli | H04W 4/14 |
| 2020/0404221 A1* | 12/2020 | Trundle | G06V 20/52 |
| 2021/0365674 A1* | 11/2021 | Veretennikov | H04N 7/18 |
| 2021/0368279 A1* | 11/2021 | Shayne | G10L 25/78 |
| 2022/0021985 A1* | 1/2022 | Wexler | G10L 25/51 |
| 2022/0057519 A1* | 2/2022 | Goldstein | G01S 17/88 |
| 2022/0198062 A1* | 6/2022 | Buscemi | G06V 40/40 |
| 2022/0199073 A1* | 6/2022 | Ramadas | G10L 15/22 |
| 2022/0199093 A1* | 6/2022 | Ramadas | G06F 21/6254 |
| 2023/0169963 A1* | 6/2023 | Sharifi | G06F 3/167 |
| | | | 704/255 |
| 2023/0245663 A1* | 8/2023 | Shayne | G06V 40/166 |
| | | | 704/273 |
| 2024/0004968 A1* | 1/2024 | Castrejon, III | G06F 21/14 |

\* cited by examiner

AUDIO RECORDING OBFUSCATION

CROSS-REFERENCE TO RELATED APPLICATION

This application claims the benefit of U.S. Provisional Application No. 63/304,744, filed Jan. 31, 2022, the contents of which are incorporated by reference herein.

BACKGROUND

The operation of connected devices within a property can be integrated to improve monitoring of the property. For example, data gathered by the connected devices can be aggregated to determine when people are present in the property.

SUMMARY

Some premises, e.g., homes or offices, have devices, such as smart doorbells, that can record audio of the environment surrounding the premises. This audio can be used to deter theft, communicate with people approaching the premises, or both.

In some instances, the audio can accidently encode data that is not necessary for a security system, a person at the premises, or both. For instance, the audio might encode speech of a home owner talking to themselves as they approach their home.

To reduce a likelihood that audio not required by the security system will be recorded, stored in memory, e.g., in a long term memory, transmitted across a network, or a combination of these, a security system can determine a likelihood that a person was communicating with the security system. Some examples of speech with a security system include a person speaking to a doorbell, e.g., that includes a microphone; a person speaking with a resident of the premises, e.g., when the resident opens the door to speak with the person visiting the premises; or speech by a delivery person that is related to delivery of a package. Although an intruder might not necessarily intentionally communicate with a security system, for the purposes of this specification, speech by a person with a resident of the premises, speech detected substantially concurrently with detection of a predetermined environmental sound, and speech by an intruder can be considered a communication with a security system.

When a security system determines that the likelihood satisfies a threshold likelihood, the security system can maintain the encoding of the speech. For instance, the security system can maintain the encoding in a database, initiate a recording by a microphone, or both.

When the security system determines that the likelihood does not satisfy the threshold likelihood, e.g., and that the person was not likely communicating with the security system, the security system can obfuscate the person's voice, e.g., speech. This can include the security system removing an encoding of the person's voice from an audio signal that encoded the person's voice along with other noise, e.g., background noise. This can include the security system determining to skip initiating a recording of the person's voice.

In general, one innovative aspect of the subject matter described in this specification relates to determining whether to maintain at least a portion of an audio recording in memory, and can be embodied in methods that include the actions of detecting, by a security system for a premises, that a person who was within a threshold area for the premises was likely uttering a sound; determining, using data from one or more sensors physically located at the premises, a likelihood that the person was communicating with the security system at the premises; determining whether the likelihood satisfies a threshold likelihood and that the person's voice should not be obfuscated; and in response to determining that the likelihood satisfies the threshold likelihood and that the person's voice should not be obfuscated, maintaining, in memory, an audio signal i) that encodes the person's voice and ii) was captured by a microphone that was physically located at the premises.

In general, one innovative aspect of the subject matter described in this specification relates to determining whether to maintain at least a portion of an audio recording in memory, and can be embodied in methods that include the actions of detecting, by a security system for a premises, that a person who was within a threshold area for the premises was likely uttering a sound; determining, using data from one or more sensors physically located at the premises, a likelihood that the person was communicating with the security system at the premises; determining whether the likelihood satisfies a threshold likelihood and that the person's voice should not be obfuscated; and in response to determining that the likelihood does not satisfy the threshold likelihood and that the person's voice should be obfuscated, obfuscating the person's voice.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Instead of or in addition to a threshold area, a threshold distance can be used. In some examples, the one or more sensors are physically located at the premises. However, this is optional. For instance, at least one of or all of the one or more sensors might not be physically located at the premises. For example, one of the one or more sensors can be physically located at a second premises adjacent to the premises, e.g., a neighboring property from which the security system receives the data.

In some implementations, detecting that the person who was within the threshold area for the premises was likely uttering a sound can include detecting, using video data captured by a camera that was physically located at the premises, an image that depicts the person's lips moving. The method can include retrieving, from a database for the premises, an audio signal encoding captured when the person was within the threshold area for the premises. Detecting that the person was likely uttering a sound can include detecting that the audio signal likely encodes the voice of the person who was within the threshold area for the premises.

In some implementations, detecting that the person who was within the threshold area for the premises was likely uttering a sound can include detecting, using audio data captured by a microphone that was physically located at the premises, an encoding of the person's voice. Determining the likelihood that the person was communicating with the security system at the premises can include determining, using the audio data captured by the microphone, the likelihood that the person was communicating with the security system at the premises.

In some implementations, determining the likelihood that the person was communicating with the security system at the premises can include determining, using voice recognition, whether a first signature for the person's voice matches a second signature included in a database that includes one or more signatures, each signature of which is for a second person for which there is at least a second threshold likelihood that the second person will be within a second threshold area for the premises. Determining whether the likelihood satisfies the threshold likelihood can include determining that the likelihood does not satisfy the threshold likelihood and that the person's voice should be obfuscated when the first signature matches the second signature.

In some implementations, determining the likelihood that the person was communicating with the security system at the premises can include determining, using voice recognition, whether a first signature for the person's voice matches a second signature included in a database that includes one or more anonymized signatures, each signature of which is for a second person for which there is at least a second threshold likelihood that the second person will be within a second threshold area for the premises. Determining whether the likelihood satisfies the threshold likelihood can include determining that the likelihood does not satisfy the threshold likelihood and that the person's voice should be obfuscated when the first signature matches the second signature.

In some implementations, obfuscating the person's voice can include removing, from an audio signal captured by a microphone that was physically located at the premises, an encoding of the person's voice. The method can include maintaining, in the audio signal, an encoding of background noise that is separate from the encoding of the person's voice. Obfuscating the person's voice can include determining to skip initiating a recording of the person's voice by a microphone that is physically located at the premises.

In some implementations, the method can include detecting that the person who was within the threshold area for the premises was likely uttering a second sound; determining, using second data from the one or more sensors, a second likelihood that the person was communicating with the security system at the premises by way of the second sound; determining whether the second likelihood satisfies the threshold likelihood and that the person's voice for the second sound should not be obfuscated; and in response to determining that the second likelihood does not satisfy the threshold likelihood and that the person's voice for the second sound should be obfuscated, obfuscating the person's voice for the second sound.

In some implementations, determining the likelihood that the person was communicating with the security system at the premises can include determining, using voice recognition, whether a first signature for the person's voice matches a second signature included in a database that includes one or more signatures, each signature of which is for a second person for which there is at least a second threshold likelihood that the second person will be within a second threshold area for the premises. Determining whether the likelihood satisfies the threshold likelihood can include determining that the likelihood satisfies the threshold likelihood and that the person's voice should not be obfuscated when the first signature does not match the second signature.

In some implementations, determining the likelihood that the person was communicating with the security system at the premises can include determining, using voice recognition, whether a first signature for the person's voice matches a second signature included in a database that includes one or more anonymized signatures, each signature of which is for a second person for which there is at least a second threshold likelihood that the second person will be within a second threshold area for the premises. Determining whether the likelihood satisfies the threshold likelihood can include determining that the likelihood satisfies the threshold likelihood and that the person's voice should not be obfuscated when the first signature does not match the second signature.

In some implementations, determining, using the data from the one or more sensors, the likelihood that the person was communicating with the security system at the premises can include determining one or more of: the likelihood that the person was speaking with a resident of the premises; the likelihood that the person spoke within a threshold time of a predetermined environmental sound detected by the security system; or the likelihood that the person is an intruder at the premises who likely uttered the sound.

The subject matter described in this specification can be implemented in various embodiments and may result in one or more of the following advantages. In some implementations, the systems and methods described in this specification can reduce an amount of speech encoded in an audio signal, a size of an audio signal, an amount of network bandwidth necessary to transmit an audio signal, or a combination of these, by obfuscating a person's voice. In some implementations, the systems and methods described in this specification can increase privacy, comply with privacy laws, or both, by obfuscating a person's voice.

In some implementations, the systems and methods described in this specification can increase a likelihood that relevant sounds maintained in an audio signal are clearer, or easier to understand by obfuscating a person's voice encoded in the audio signal. For instance, when the audio signal encodes multiple sounds at the same time, obfuscating the encoding of the person's voice encoded in the audio signal, e.g., removing the encoding, can make the other sounds encoded in the audio signal clearer or easier to understand given that there are fewer sounds encoded at the same time in the audio signal.

In some implementations, the systems and methods described in this specification can improve the clarity of sounds maintained in an audio signal by normalizing one or more of the sounds. For instance, the systems and methods described in this document can normalize a person's voice that is maintained in an audio signal when other sounds encoded in the audio signal are louder than the person's voice.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
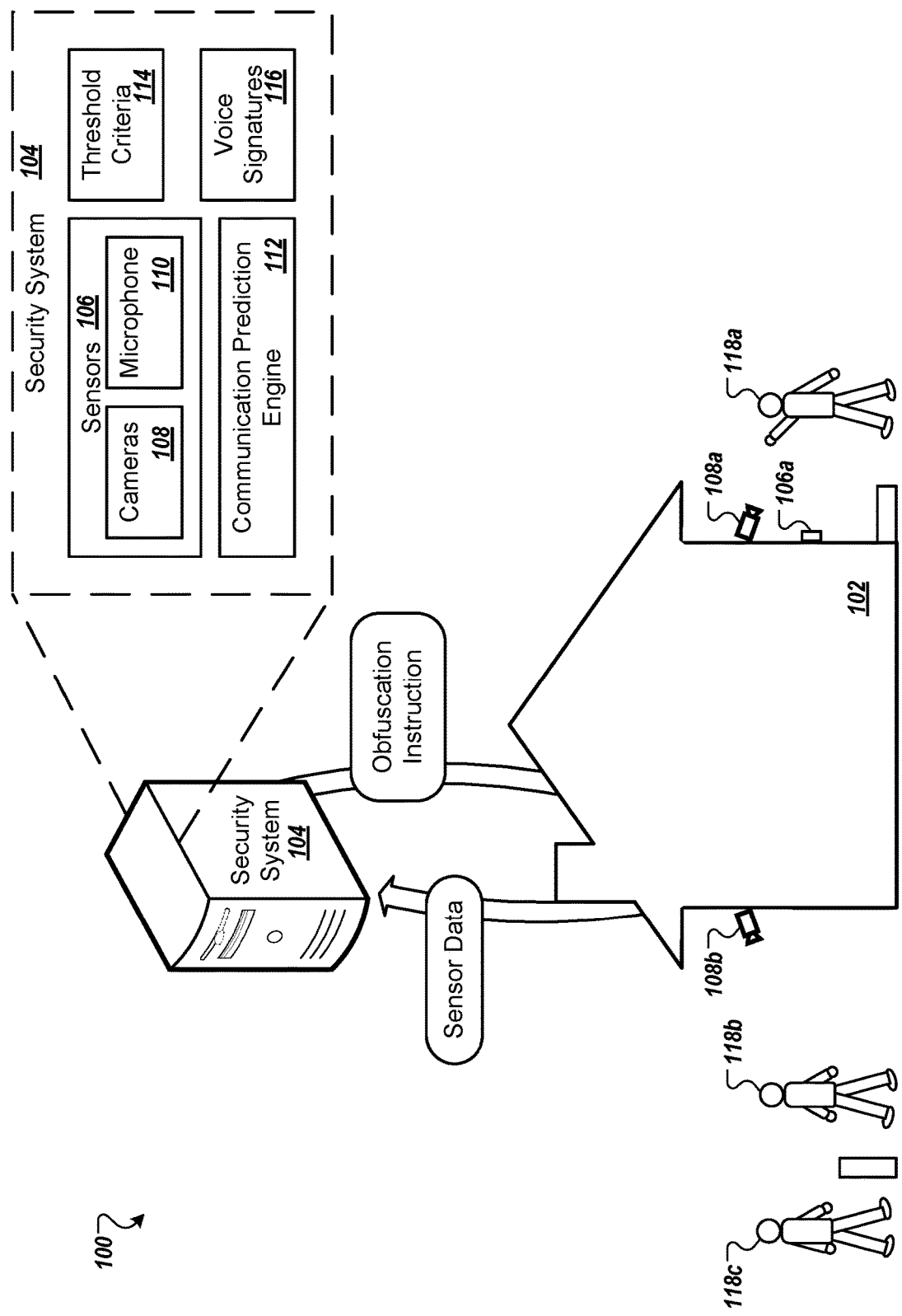
FIG. 1 depicts an example environment of a security system that selectively obfuscates audio for a premises.

FIG. 1 depicts an example environment 100 of a security system 104 that selectively obfuscates audio for a premises 102. The security system 104 can determine whether to obfuscate the audio given a likelihood that a person is speaking with the security system 104 or that the security system 104 might otherwise require the audio for later analysis. The former can occur when the person uses the security system 104 to communicate with another person at the premises 102 or to communicate directly with the security system 104, e.g., when dropping off a package. The latter can occur when the security system 104 determines that the person might be trying to break into the premises 102, or in other appropriate situations.

For example, the security system 104 can include one or more sensors 106, such as cameras 108 and microphones 110. In some examples, the sensors 106 can include other types of sensors. One example of a sensor can include a smart doorbell 106a. The smart doorbell 106a can include a camera, a microphone, or both. In some examples, the smart doorbell 106a includes a microphone and the premises 102 has a separate camera 108a.

The security system 104 can receive data from the sensors 106. The security system 104 can analyze the sensor data as the security system 104 receives the sensor data, e.g., in real time, after the security system 104 receives the sensor data, e.g., offline, or a combination of both.

As part of the analysis, the security system 104 can analyze the sensor data from the sensors 106 to detect whether a person 118a is within a threshold distance of, the threshold area for, or both, the premises 102. The security system 104 can store data for the threshold distance, the threshold area, or both, as one of multiple threshold criteria 114. The threshold distance can be any appropriate distance, such as a predetermined distance from the premises 102, e.g., as defined by a radius extending from the center of the premises 102, a predetermined distance from the edge of a yard in which the premises 102 is located, the range of one or more of the sensors 106, e.g., of the microphone 110, or another appropriate distance. In some examples, the predetermined distance can be defined by operator input, e.g., an administrator for the security system 104 or a user of the security system 104 such as the owner of the premises 102.

In some implementations, the threshold area can be any area in or around a physical area around the premises 102. For instance, the threshold area can include an area defined around the premises 102 given the threshold distance, e.g., the threshold area can include the threshold distance, defined by the contours of a yard around the premises 102, defined by a distance from the contours of the yard, or a combination of these. In some examples, the threshold area can be an area that is not defined by a threshold distance. For instance, the area can be in a front lawn on the premises 102, e.g., that includes a sidewalk that approaches a front door for the premises 102.

The threshold area can be determined using any appropriate process. For instance, the security system 104 or another system can determine one or more threshold areas, e.g., based on an analysis of images for the premises 102 that depict people near the premises. In some examples, the threshold area can be a user defined area. For instance, a user device can receive user input that indicates an arbitrarily drawn area that identifies the boundaries of the threshold area. The user device can receive the input using any appropriate process, e.g., in a user interface, using a microphone for voice commands, or both.

For instance, the security system 104 can receive sensor data from the smart doorbell 106a and analyze the sensor data. While analyzing the sensor data, the security system 104 can determine that the sensor data indicates that the person 118a is within the threshold distance from, the threshold area for, or both, the premises 102. The security system 104 can make this determination when a camera included in the smart doorbell 106a captures an image that depicts the person 118a, when the security system 104's analysis of an image captured by the smart doorbell 106a indicates that the person 118a is within a predetermined physical distance of the premises 102, when an audio signal encoded by the smart doorbell 106a encodes speech or another utterance made by the person 118a, or a combination of two or more of these. In some examples, the security system 104 can detect sounds encoded in the audio signal such as the person humming a tune.

When the security system 104 determines that the person 118a is not within the threshold distance from, the threshold area for, or both, the premises 102, the security system 104 can discard sensor data of the person 118a, discard audio sensor data of the person's voice, not record audio sensor data of the person's voice, or perform another appropriate action. For instance, the security system 104 can discard any audio data, e.g., encoding any person's voice, when the respective person is not within the threshold distance from, the threshold area for, or both, the premises 102. The security system 104 can discard the sensor data and not perform any additional analysis on the sensor data, e.g., decide to skip determining a likelihood that the person was communicating with the security system 104.

When the security system 104 determines that the person 118a is within the threshold distance from, the threshold area for, or both, the premises 102, the security system can perform additional analysis of the person 118a, the sensor data, other sensor data for the person 118a, or a combination of two or more of these. For instance, the security system 104 can use sensor data from the sensors 106 to determine a likelihood that the person 118a was communicating with the security system 104. The security system 104 can determine this likelihood using any appropriate process. The security system 104 can compare the likelihood with a threshold likelihood, from the threshold criteria 114, to determine whether, what, or both, additional analysis to perform.

For example, the security system 104 can use image data to determine a likelihood that the person is speaking. The security system 104 can use image data to determine whether another person is near, e.g., within a second threshold distance of, the person.

For instance, the security system 104 receives image data from a second camera 108b. The image data can depict a second person 118b and a third person 118c. At least some images included in the image data can depict the second person 118b talking. By analyzing the images, the security system 104 can determine that the second person 118b is both within the threshold distance of, the threshold area for, or both, the premises 102 and talking. However, in this example, the security system 104 can determine that the second person 118b is not likely communicating with the security system 104 given the proximity of the second person 118b to the third person 118c, e.g., that a likelihood that the second person 118b is communicating with the security system 104 does not satisfy a threshold likelihood.

In some examples, the security system 104 can determine that a speaker who is in close proximity to another person is likely communicating with the security system 104. For instance, the security system 104 can perform speech recognition, voice recognition, or both, on an audio signal that encodes the person's speech. In this example, the security system 104 can analyze an audio signal that encodes the second person's 118b speech. The security system 104 can determine a likelihood that the second person 118b is communicating with the security system 104 using a result of this analysis, e.g., a likelihood that the second person is asking the security system 104 a question. The security system 104 can then compare the likelihood with the threshold likelihood to determine whether the likelihood satisfies the threshold likelihood, e.g., and the second person 118b is likely communicating with the security system 104.

The security system can use any appropriate data to determine the likelihood. For instance, the security system can use video data; audio data; data that indicates where the person is standing with respect to the premises, e.g., if the person is within a threshold distance of a door or a window of the premises 102; a voice signature for the person; a keyword or key phrase; data that indicates whether the person is communicating with another person; whether there is an alarm condition at the premises 102; whether the sensor data indicates that a doorbell was pressed; sensor data from a device at the premises 102, such as a smart phone or a vehicle; or a combination of two or more of these.

When using data from a smart phone, a vehicle, or another location based device that can provide location data to the security system 104, the security system 104 can determine a location of a person with the corresponding location based device. The security system 104 can receive location data from the location based device to determine an approximate location of the device. The security system 104 can use the location data to determine whether captured sensor data likely was generated by a person using the location based device, the location based device itself, e.g., when the device is playing music, or both. The security system 104 can use the first likelihood that the captured data likely was generated by the person using the location based device, the location based device itself, or both, to determine the second likelihood that a person was communicating with the security system 104. In some examples, the security system 104 can determine the second likelihood as the opposite percentage of the first likelihood, e.g., second likelihood=(1−first likelihood).

In some implementations, the security system 104 can use one or more voice signatures 116 when determining the likelihood. The voice signatures 116 can include voice signatures for people who are likely to communicate with the security system 104, e.g., a resident of the premises 102, people who are not likely to communicate with the security system 104, e.g., a neighbor, or both. The security system 104 can require permission before adding a voice signature to the voice signatures 116, e.g., permission from the person for whom the voice signature was generated.

For example, the security system 104 can store voice signatures 116 for one or more people who are within the threshold area for, e.g., distance from, the premises 102 at least a threshold amount of time, e.g., residents of the premises 102. When the security system 104 detects an audio signal that encodes the voice of one of the people, using the voice signatures, the security system 104 can access corresponding settings for the voice signature to determine whether the security system 104 should maintain or obfuscate the person's voice. A setting for a resident of the premises 102 can indicate that the security system 104 should maintain the person's voice in audio signals. A setting for a neighbor can indicate that the security system 104 should obfuscate the neighbor's voice, e.g., absent a separate trigger that causes the security system 104 to determine otherwise, such as the security system 104 determining that the neighbor spoke a key phrase, or triggered the smart doorbell 106a.

The security system 104 can analyze any appropriate data when determining the likelihood. The security system 104 can analyze the same data that was analyzed when determining whether the person was within the threshold distance of, the threshold area for, or both, the premises 102 when determining the likelihood that the person was communicating with the security system 104. The security system 104 can analyze different data when determining the likelihood that the person was communicating with the security system 104 than the data analyzed when determining whether the person was within the threshold distance of, the threshold area for, or both, the premises 102.

Once the security system 104 determines a likelihood that the person 118a-b was communicating with the security system 104, the security system 104 can compare the likelihood with the threshold likelihood to determine whether the likelihood satisfies the threshold likelihood. The likelihood can satisfy the threshold likelihood when the likelihood is greater than, equal to, or either greater than or equal to the threshold likelihood.

When the likelihood satisfies the threshold likelihood, the security system 104 can determine to maintain an encoding of the person's voice in memory. For instance, the security system or another system can include a database of voice recordings.

Figure 2:
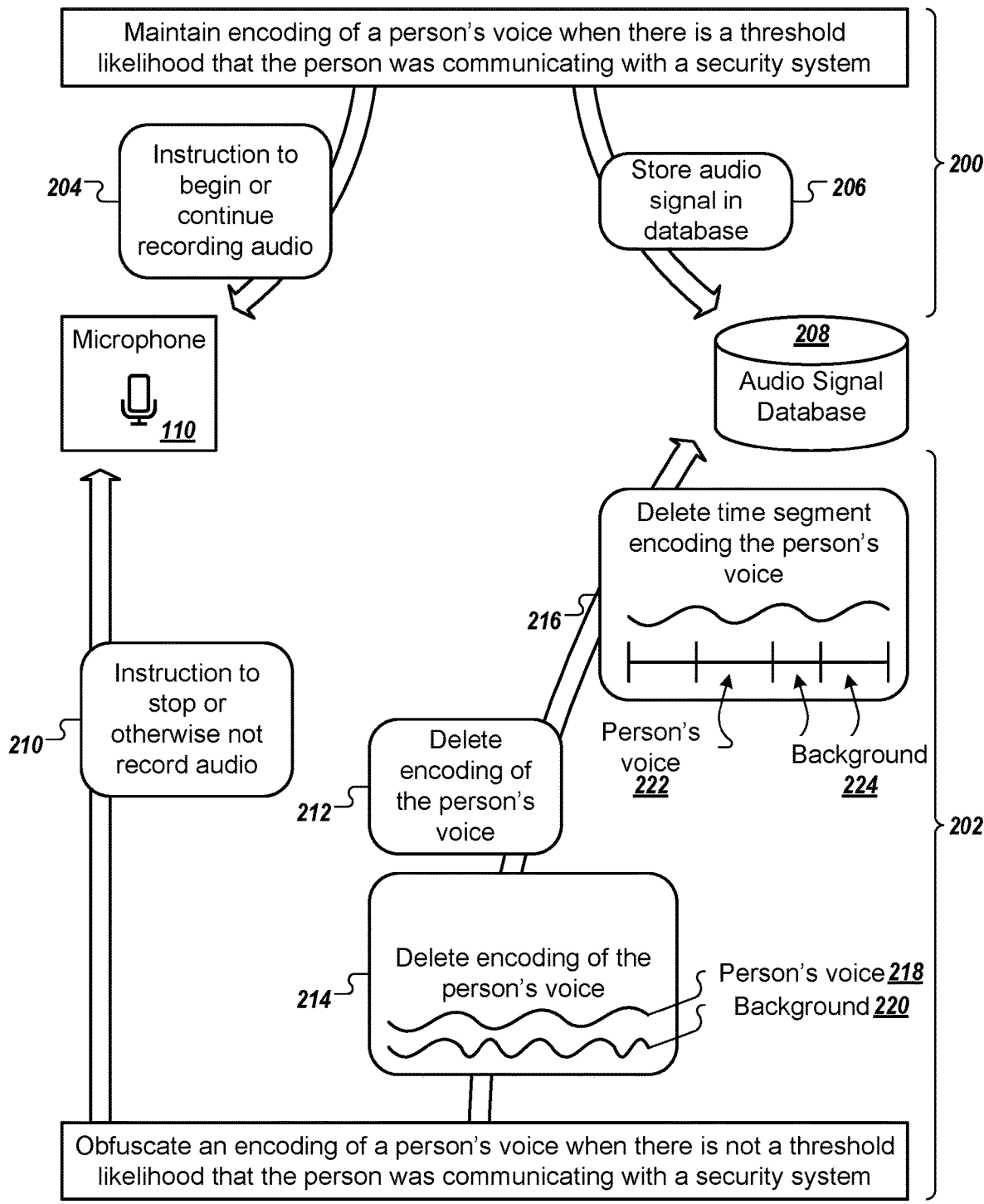
FIG. 2 depicts some examples of maintaining or obfuscating audio.

FIG. 2 depicts some examples of maintaining 200 or obfuscating 202 audio. For example, the security system 104 can determine to send an instruction 204 to a microphone to cause the microphone to record the person's voice. The recording can create a new audio signal that encodes the person's voice or can continue creation of a prior audio signal that encodes the person's voice, e.g., a portion of which the security system 104 analyzed previously as described above. The security system 104 can determine to maintain 206, in a database 208, the audio signal that encodes the person's 118a-b voice. This encoding can be of the person speaking, or the person making another utterance, such as humming. In some examples, the security system 104 can treat a person's singing or otherwise uttering words as speaking. The database can be part of the security system or another system.

Returning to FIG. 1, when the likelihood does not satisfy the threshold likelihood, the security system 104 can determine to obfuscate an encoding of the person's voice. The security system 104 can obfuscating the encoding of the person's voice using any appropriate process. In some examples, the security system 104 can determine a process to use when obfuscating the encoding of the person's voice depending on a type of the encoding, a source of the encoding, e.g., a microphone or a database, a time duration between when the security system 104 performs its analysis and the encoding was captured, a predicted type of sound included in the encoding, e.g., speech, singing, or humming, or a combination of these.

For instance, the security system 104 can determine to use a first obfuscation process for a first type of encoding and a second, different obfuscation process for a second, different type of encoding. Some examples of encoding types can include an encoding received from a microphone, an encoding stored in a database, e.g., at the security system 104, or an encoding stored in a long term memory, e.g., in a database on a system separate from the security system 104.

The security system 104 can determine to use a first obfuscation process for a first time duration between the security system's 104 analysis and capture of the encoding or to use a second, different obfuscation process for a second, different time duration. The security system 104 can compare a current duration with a threshold duration to determine whether the current duration corresponds to the first time duration, e.g., a first range, or the second, different time duration, e.g., a second range. For example, the security system 104 can use a first obfuscation process that discards the encoding when the time duration is shorter and a second obfuscation process that removes the encoding from a database when the time duration is longer, e.g., and the encoding was stored in a database during that longer time period.

The security system 104 can use a predicted type of sound to determine the obfuscation process. For instance, the security system 104 can use a first obfuscation process, e.g., that is faster, to obfuscate a person's voice when the person was humming. This can include removing any characteristics from the encoding that could be used to personally identify the person 118a. The security system 104 can use a second obfuscation process, e.g., that is slower, to obfuscate a person's voice when the person is singing. This can include the security system 104 removing, from the encoding, the portion that encodes the person's voice. This can include maintaining, in the encoding, other noise that encodes other sounds, e.g., when the other sounds are not another person's voice that might also need to be obfuscated.

Returning to FIG. 2, Some example obfuscation processes can include sending 210 an instruction to cause a microphone to stop or otherwise not record audio, deleting 212 the encoding of the person's voice, removing 214, from the encoding, the portion of the encoding that encodes the person's voice, removing 216, from the encoding, the time segment in which the person's voice was encoded, or a combination of two or more of these. Removing the portion of the encoding that encodes the person's voice can include the security system removing or otherwise canceling out the bits 218 that encode the person's voice while maintaining, for the same time segments that encode the person's voice, one or more other bits 220 that encode other sounds. Removing the time segment can include determining, for the encoding that spans multiple time segments, the time segment 222 during which the person's voice is encoded and removing that time segment while maintaining other time segments 224, e.g., that can each have different lengths.

Returning to FIG. 1, in some implementations, the threshold criteria 114 can include two or more thresholds for a particular value. For example, the security system 104 can maintain in the threshold criteria 114 two or more threshold distances, two or more threshold areas, two or more threshold likelihoods, or a both. The security system 104 can select a threshold to use from the two or more threshold using data for the scenario that the security system 104 is analyzing. A scenario can include an instance of a person uttering a sound, whether the person is alone or in a group of people. When a person is part of a group of people, there can be a single scenario for each person and corresponding data for the scenario.

The security system 104 can determine which of the two or more thresholds to use during any particular scenario with configuration data, e.g., included in the threshold criteria. The configuration data can indicate that the security system 104 can use different thresholds during different times of day, different days of week, different weather conditions, given different input data, or a combination of two or more of these.

In some examples, the configuration data can indicate that the security system 104 should use a different threshold given different sensor data, as a type of input data, received from the sensors 106. For instance, when the security system 104 receives sensor data that indicates that two people are talking, one or more people are walking toward the premises 102, one or more people are walking away from the premises 102, that a person depicted in an image is likely an emergency services person, or a combination of these, the security system 104 can select from different thresholds included in the threshold criteria 114.

In this way, the security system 104 can select a first threshold criteria 114 during the night and a second, different threshold criteria 114 during the day, and perform different actions, e.g., determine that the threshold is or is not satisfied, even though all other data are the same for the two scenarios. In some examples, the security system 104 can perform different actions when sensor data for different numbers of people are captured even though that data is captured during the same time of day, day of week, or both, given the use of different thresholds for the different numbers of people.

In some implementations, the security system 104 can determine whether the premises 102, the security system 104, or both, are in an alarm state, an armed state, a disarmed state, or a combination of two or more of these. Using this determination, the security system 104 can select different thresholds; determine whether to skip determining a likelihood or whether a threshold is satisfied; or a combination of both. For instance, when the security system 104 determines that the premises 102, the security system 104, or both, are in an armed state or a disarmed state, the security system 104 can select a different threshold from the threshold criteria 114 than the security system 104 would select were the other state active.

In some examples, the security system 104 can determine to skip determining a likelihood that the person 118 was communicating with the security system 104. For instance, in some implementations, when the security system 104 detects a person who is malicious, e.g., trying to break into the premises 102, the security system 104 can determine to initiate an alarm state. When in an alarm state, the security system 104 can determine to skip determining a likelihood that the person is trying to communicate with the security system 104, skip determining whether the likelihood satisfies a threshold likelihood, or both. In these implementations, the security system 104 can maintain an encoding of the person's voice. The security system 104 can perform any other appropriate action, such as notify security personnel, notify the police, trigger an alarm at the premises 102, or a combination of these.

In some implementations, the security system 104 can perform some analysis for a person multiple times. For instance, as the person 118a approaches the premises 102, the security system 104 can make a first determination whether to obfuscate the person's voice for a first time period. The first time period can be while some of the sensors 106 capture data for the person 118a and a distance between the person and the premises 102 does not satisfy a threshold distance, the threshold area, or both. As part of the first determination, the security system 104 can determine to obfuscate the person's voice.

The security system 104 can continue to make obfuscation decisions while the person approaches the house, moves, speaks, performs other actions, or a combination of two or more of these. When the person's distance from the premises 102 satisfies the threshold distance, or the person's location satisfies the threshold area, or both, the security system 104 can make a second determination whether to obfuscate the person's voice for a second time period. Although the second time period is after the first time period, there can be other time periods, other determinations, or both, between the two time periods.

In this example, the second time period can be a time during which the person 118a is within the threshold distance from, the threshold area for, or both, the premises 102. This can be when the person 118a is near a landing by a door to the premises 102, near a package drop off area, or at another appropriate location.

As part of the second determination, the security system 104 can determine to maintain an encoding of the person's voice. For example, the security system 104 can determine to store the encoding received from the microphone 110 in a memory, e.g., in a database.

In some examples, the security system 104 can determine to maintain an encoding of the person's 118a voice when the person 118a performs a predetermined action. The predetermined action can be any appropriate action, such as triggering a doorbell. In these examples, the premises 102 can have a sign or other notification, e.g., an electronic notification using near-field communication, that indicates that performance of the predetermined action will cause the security system 104 to maintain an encoding of the person's 118a voice.

The security system 104 can analyze data in real time, offline, or both. For instance, the security system 104 can analyze sensor data as it is captured by one of the sensors 106 and before the sensor data is stored in permanent memory, e.g., while the person 118a is currently at the premises 102. In some examples, the security system 104 can analyze sensor data after it is captured by one of the sensors 106 and stored in permanent memory, e.g., after the person 118a left an area around the premises 102, entered the premises 102, or both.

When the security system 104 analyzes data before it is stored in permanent memory, the security system 104 can reduce network traffic to the permanent memory, or an amount of the memory used, by determining whether to obfuscate a portion of an audio signal that encodes a person's voice, by obfuscating a portion of an audio signal that encodes a person's voice, or both. For instance, by obfuscating the portion of the audio signal, the security system 104 can reduce a size of the audio signal such that transmission of the reduced size audio signal reduces an amount of network bandwidth used to transmit the audio signal to the permanent memory. The network can be a network that connects the security system 104 to another system, connects various components of the security system 104, or a combination of both. By obfuscating the portion of the audio signal, the security system 104 can reduce an amount of the memory required to store the audio signal.

The security system 104 can be physically located at the any appropriate location. For instance, at least a portion of the security system 104, e.g., the sensors 106, can be physically located at the premises 102. At least a portion of the security system 104 can be physically located somewhere other than the premises 102, e.g., at a computing center.

Although some of the examples refer to analysis of data give that the person "is" doing something, these examples can also apply to situations in which the person "was" doing the same thing. For instance, the security system 104 can analyze sensor data to determine whether the person "was" within the threshold distance of, the threshold area for, or both, the premises 102, whether a likelihood that the person was communicating with the security system at the premises satisfies a threshold likelihood, or both, while the person is still within the threshold distance of, the threshold area for, or both, the premises 102, e.g., shortly after the person spoke, triggering analysis by the security system 104.

The security system 104 is an example of a system implemented as computer programs on one or more computers in one or more locations, in which the systems, components, and techniques described in this specification are implemented. The location based devices can include personal computers, mobile communication devices, and other devices that can send and receive location data over a network. The network (not shown), such as a local area network ("LAN"), wide area network ("WAN"), a nearfield connection, the Internet, or a combination thereof, connects the location based devices, the security system 104, multiple components of the security system 104, or a combination of two or more of these. The components of the security system can include the sensors 106, the cameras 108, the microphone 110, and one or more computers that implement the security system 104, the communication prediction engine 112, or both. The one or more computers can be separate from the sensors 106 when the sensors 106 are physically located throughout the premises 102. The one or more computers that implement the security system 104 can be physically remote from the premises 102, at the premises 102, or a combination of both. The security system 104 may use a single server computer or multiple server computers operating in conjunction with one another, including, for example, a set of remote computers deployed as a cloud computing service.

The security system 104 can include several different functional components, including the communication prediction engine 112. The communication prediction engine 112 can include one or more data processing apparatuses. For instance, the communication prediction engine 112 can include one or more data processors and instructions that cause the one or more data processors to perform the operations discussed herein.

In some implementations, one or more of the functional components of the security system 104, e.g., the communication prediction engine 112, the threshold criteria 114, or the voice signatures 116, can be implemented on one or more of the sensors 106. For instance, a first sensor can implement a first functional component, e.g., a first communication prediction engine, and a second sensor can implement a second functional component, e.g., a second communication prediction engine or the voice signatures or both.

The various functional components of the security system 104 may be installed on one or more computers as separate functional components or as different modules of a same functional component. For example, the communication prediction engine 112 can be implemented as a computer program installed on one or more computers in one or more locations that are coupled to each through a network. In cloud-based systems for example, these components can be implemented by individual computing nodes of a distributed computing system.

Figure 3:
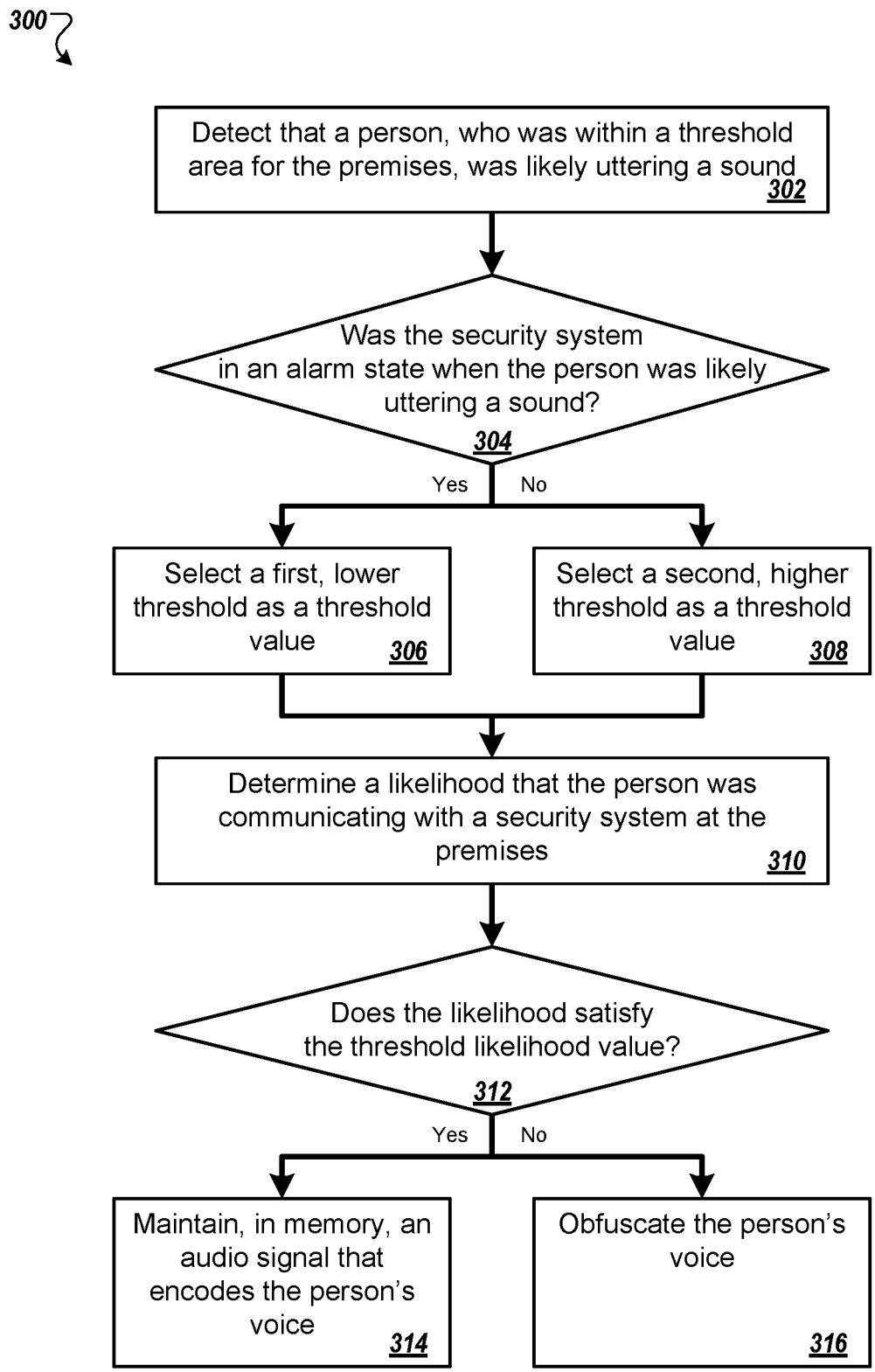
FIG. 3 is a flow diagram of a process for selectively obfuscating audio.

FIG. 3 is a flow diagram of a process 300 for selectively obfuscating audio. For example, the process 300 can be used by the security system 104 from the environment 100.

A security system detects that a person, who was within a threshold area for the premises, was likely uttering a sound (302). The sounds can include speaking, singing, humming, or other appropriate sounds. For instance, the security system can receive data that indicates that the person was likely speaking, such as speech data. In some examples, the security system can detect a person that was likely speaking. For the purposes of this specification, speech can include singing and other sounds that include utterances of words.

In some examples, the security system can receive sensor data from multiple devices. The security system can receive first data from a camera and receive second data from a microphone. The security system can analyze the second data and determine that the second data encodes speech. The security system can analyze the first data and determine that one or more pictures included in the first data depict the person. The security system can determine that the first data was captured substantially concurrently with the second data. The security system can determine that the first data depicts the person's lips moving. In response to determining that the first and second data were captured substantially concurrently, and that the first data depicts the person's lips moving, the security system can detect that the person was likely uttering a sound.

The security system determines whether the security system was in an alarm state when the person was likely uttering a sound (304). For instance, the security system can determine whether to use a first, lower threshold for when the security system is in an alarm state or a second, higher threshold for when the security system is not in an alarm state. The security system can have multiple threshold to reduce an amount of speech encoded in corresponding audio signals, and memory required to store the audio signals, by reducing an amount of speech that will be encoded in the audio signals when the security system is not in the alarm state and uses the second, higher threshold. When the security system is in the alarm state, the security system might be more likely to require an audio signal encoding speech and using the lower threshold during this time periods can increase the probability that the security system will encode speech in the audio signal when required.

The security system selects a first, lower threshold as a threshold value (306). For instance, when the security system determines that the security system was in the alarm state when the person was likely uttering a sound, the security system can select the first, lower threshold to use during further analysis.

The security system selects a second, higher threshold as a threshold value (308). For example, when the security system determines that the security system was not in the alarm state when the person was likely uttering a sound, the security system can select the second, higher threshold to use during further analysis.

The security system determines a likelihood that the person was communicating with a security system at the premises (310). The security system can use any combination of multiple different parameters to determine the likelihood. In this specification, the likelihood that the person was communicating with the security system can also include a likelihood that the person was trying to break into the premises.

The parameters can be any appropriate parameters for analysis of whether the person was trying to communicate with the security system, such as environmental parameters. The parameters can include data that indicates where the person was standing with respect to the premises. The parameters can include data that indicates whether the security system recognizes the person, e.g., using facial recognition, voice recognition, or both. This can occur for an owner or another resident of the premises, e.g., who opted in to use of facial recognition by the security system.

The parameters can include a direction in which the person is facing. For instance, the security system can determine a higher likelihood for a person who is facing the premises or a predetermined area of the premises. The predetermined area of the premises can include a microphone or another area identified for communication with the security system, e.g., a call box.

The parameters can include a number of people who are standing together, whether, how, or both, the people are interacting, or a combination of these. For instance, the security system can determine a lower likelihood when a person who is likely uttering a sound is with one or more other people than if the person were alone.

The parameters can include one or more visual cues depict in an image. The visual cues can include hand movements, interaction with objects at the premises, e.g., a doorbell, or both.

In some implementations, the security system can analyze image data and audio data to determine whether the movement of the person's lips match audio encoded in an audio signal. The parameters can include a result of this analysis. When the movement matches the encoded audio, the security system can determine a higher likelihood. When the movement does not match the encoded audio, the system can determine a lower likelihood, e.g., because the audio likely came from another source other than the person.

In some implementations, the security system can determine a cadence of a conversation between people. The security system can use the cadence to determine the likelihood, e.g., as one of the parameters.

The parameters can include environmental parameters, such as parameters that represent other sounds encoded in the audio signal. The other sounds can include the sounds of animals, a window breaking, glass breaking, a rock hitting another object, a vehicle, or any other appropriate sound. The security system can determine a higher likelihood when the other sounds include the sound of a window breaking than would otherwise be determined, e.g., all other parameters being the same.

In some implementations, the parameters can indicate that if an audio signal, or multiple audio signals captured substantially concurrently, e.g., by a single microphone or multiple microphones, encode data for a predetermined environmental parameter along with a person's voice, that the security system should maintain the encoding of the person's voice, e.g., that there is a higher likelihood that the person was communicating with the security system than if the predetermined environmental parameter was not encoded. This can occur when the security system captured two audio signals, a first that encodes a window breaking and a second of a person's voice.

The security system determines whether the likelihood satisfies the threshold likelihood value (312). For instance, the security system can compare the likelihood with the threshold likelihood. The security system can use a result of the comparison to determine whether the likelihood satisfies the threshold likelihood. In some examples, the likelihood satisfies the threshold likelihood when the likelihood is greater than, equal to, or either greater than or equal to the threshold likelihood. In some examples, the likelihood satisfies the threshold likelihood when the likelihood is less than, equal to, or either less than or equal to the threshold likelihood.

The security system maintains, in memory, an audio signal that encodes the person's voice (314). For example, in response to determining that the likelihood satisfies the threshold likelihood, the security system can maintain the audio signal in memory. If the audio signal is already stored in memory, e.g., in a database, the security system can determine to keep the audio signal in memory. If the audio signal is not already stored in a database, the security system can determine to store the audio signal in a database. In response, the security system can store the audio signal that encodes the person's voice in the database.

The security system can determine to maintain the person's encoded in the audio signal when the security system determined a likelihood using environmental sounds, such as the sound of a breaking window. For instance, upon detecting a breaking window, the security system can determine a likelihood that would be higher than if the security system had not detected the breaking window. This can occur when there is a higher chance that the person might be associated with the breaking window and the audio signal encoding the person's voice can be used for analysis related to the breaking window.

The security system obfuscates the person's voice (316). For instance, the security system can obfuscate the person's voice in response to determining that the likelihood does not satisfy the threshold likelihood.

In some examples, the security system can obfuscate the person's voice in response to determining that the person's voice matches a voice signature for which the security system should obfuscate voices. The voice signature can be a neighbor's voice signature, a child's voice signature, or any other appropriate voice signature.

In some examples, the security system can analyze voice signatures to determine one or more parameters for analysis of a likelihood, the threshold value, or both. For instance, the security system can determine whether the encoded voice matches a voice signature for which different parameters are used to determine a likelihood that the person was communicating with the security system compared to people whose voice does not match a voice signature with different parameters. The parameters can indicate a different distance from the premises, a particular direction in which the person should be facing, or any other appropriate parameters for determining a likelihood that the person was communicating with the security system. In this way, the security system can use a shorter distance or a different direction in which the person is facing for a neighbor, a child, or another appropriate person compared to someone else, e.g., a delivery person.

In some examples, the security system can determine to remove an encoding of the person's voice, or skip maintaining an encoding of the person's voice. The security system can determine to remove the encoding of the person's voice from a memory, e.g., a database, from an encoding that includes one or more other sounds, or both. The security system can determine to skip maintaining the encoding of the person's voice when the security system receives the encoding from a microphone. In this example, the security system can discard the encoding without storing the encoding in memory.

The order of steps in the process 300 described above is illustrative only, and selectively obfuscating the audio can be performed in different orders. For example, the security system can determine the likelihood that the person was communicating with the security system (e.g., step 310) and then determine whether the security system was in an alarm state (e.g., step 304).

In some implementations, the process 300 can include additional steps, fewer steps, or some of the steps can be divided into multiple steps. For example, the security system can select the threshold value using other data, e.g., including or other than whether the security system was in an alarm state.

In some implementations, the security system can perform steps 302, 310, 312, and either step 314 or 316 without performing the other steps in the process 300. In some examples, the security system can perform steps 302, 304, 308, 312, and 316 without performing the other steps in the process 300. In some examples, the security system can perform steps 302, 304, 308, 312, and 314 without performing the other steps in the process 300. In some implementations, the security system can perform steps 302, 304, 306, 310, 312, and either step 314 or 316 without performing the other steps in the process 300.

In some implementations, when the person is in a group of people, the security system can determine likelihoods for each person in the group. As a result, the security system can determine to maintain audio for at least one person in the group and determine to obfuscate audio for at least another person in the group. In these implementations, the security system can perform the process 300 multiple times, including performing some of the steps in the process 300 for a first person and some of the steps in the process 300 for a second, different person. The security system can perform at least some of the steps for each of the people, e.g., step 310.

In some implementations, the security system, or a device in the security system such as a microphone, can encode two audio signals for the same time period. The first audio signal can encode speech, e.g., either for a person or multiple people. The second audio signal can encode other sounds, e.g., background sounds such as animals, vehicles, or both. The security system can analyze the first audio signal to determine whether to obfuscate a portion of the audio signal.

In some implementations, when more than one person is detected, e.g., by the security system or a device in the security system, the security system can encode one audio signal for each person. The security system can analyze each audio signal and determine whether to obfuscate the person's voice encoded in the audio signal.

In some implementations, the security system can receive the audio signal encoding the person's voice as part of a process, e.g., a background process, that periodically samples audio from the environment around the premises. In these implementations, the security system can analyze the audio signal and determine whether to initiate recording audio by a microphone, e.g., to record more audio from the environment.

For instance, a microphone at the premises can sample audio from the environment and send the sample audio to the security system, e.g., a communication prediction engine. The security system can analyze the sampled audio to determine a likelihood that the audio encodes a person's voice. Upon determining that the audio encodes a person's voice, the security system can send an instruction to the microphone or another microphone to cause the receiving microphone to record additional audio from the environment.

In some implementations, the security system can determine to maintain sounds that were likely generated by an object that is not depicted in an image captured by a camera, e.g., when the images captured substantially concurrently with detection of the sound do not depict the object. For instance, the security system can analyze an audio signal that encodes a sound and images captured substantially concurrently with the encoding of the sound. The security system can determine, from the analysis of the audio signal and the images, that the sound was likely generated by an object, e.g., a person or an animal or an inanimate object, that was not depicted in any of the images.

The security system can analyze other data captured substantially concurrently with the encoding of the sound. For instance, the security system can determine that one of the images depicts a person who was not talking when the sound was encoded. The security system can determine that the person was talking after the sound finished, e.g., that the person is talking to another person who spoke the sound and is out of a field of view of the cameras in the security system. The security system can determine whether the person is a resident of the premises or the person's speech should otherwise be recorded, e.g., that the person is likely speaking with the security system. If so, the security system can determine to maintain the sound spoken by the other person who was not depicted in any of the images.

In some examples, the security system can determine to maintain the sound that was likely generated by an object not depicted in any of the images based on a type of the sound. For instance, the security system can determine that the sound satisfies an environmental parameter for sounds that should be maintained. Environmental parameters can include parameters that represent a breaking window, breaking glass, a car alarm, or one object crashing into another, to name a few examples.

In some implementations, the security system can normalize one or more sounds maintained in an audio signal. For instance, when the security system determines to maintain an encoding of a person's voice in an audio signal, the security system can determine a loudness of the person's voice. The security system can determine one or more loudnesses of other sounds encoded in the audio signal. The security system can compare the loudness of the person's voice with at least one of the one or more loudnesses for the other sounds encoded in the audio signal to determine a comparison result.

If the comparison result satisfies a threshold, the security system can normalize the encoding of the person's voice, e.g., increase the loudness of the person's voice in the audio signal. The comparison result can satisfy the threshold when the loudness is less than a threshold percentage of the loudnesses, when the loudness is less than a predetermined quantity of the loudnesses, e.g., one or more, or in other appropriate situations.

If the comparison result does not satisfy the threshold, the security system can maintain the encoding of the person's voice in the audio signal. For example, the security system can maintain the encoding of the person's voice without adjusting the loudness of the person's voice in the audio signal.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the security system that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a security system.

Figure 4:
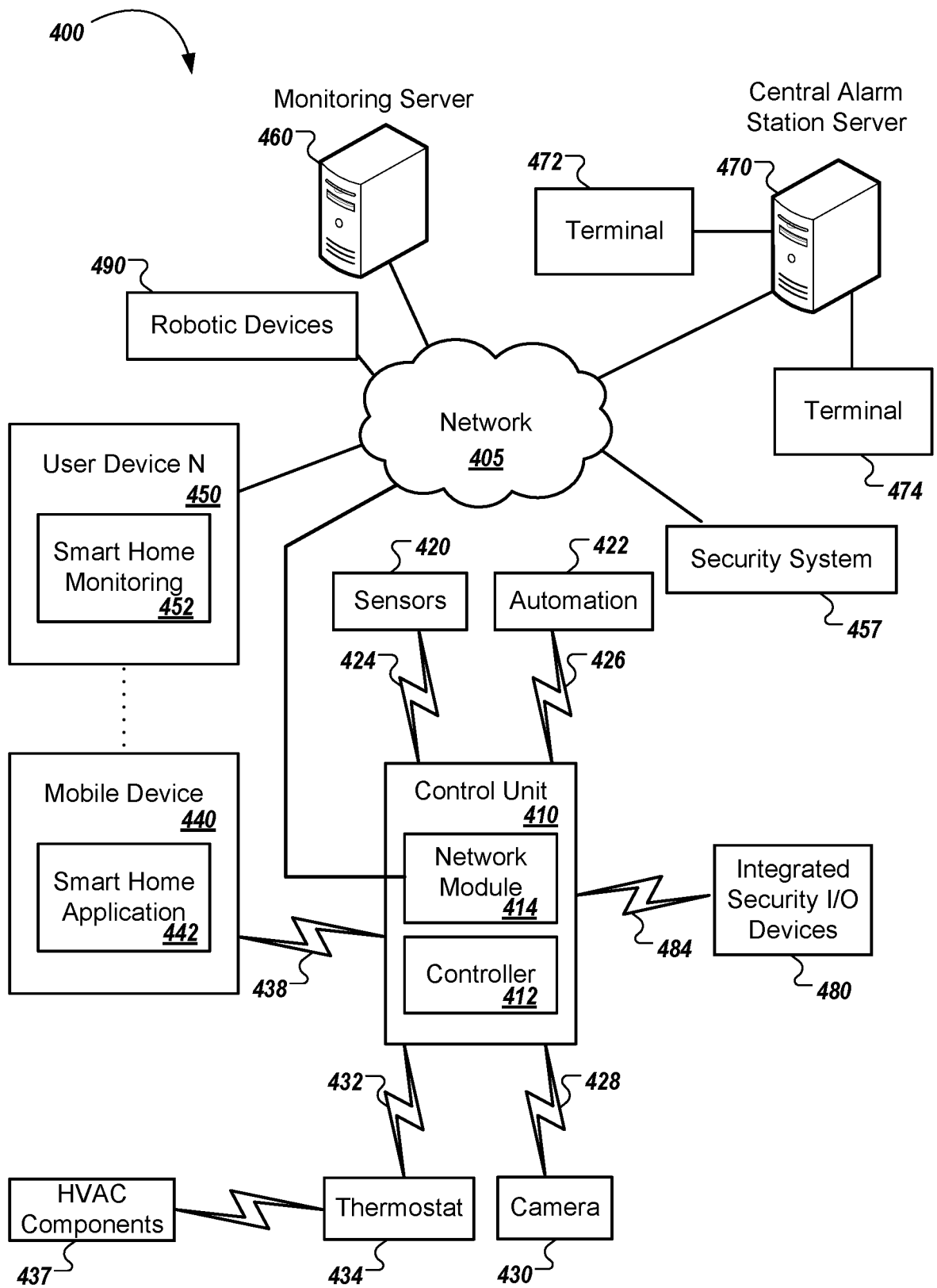
FIG. 4 is a diagram illustrating an example of a home monitoring system.

FIG. 4 is a diagram illustrating an example of a home monitoring system 400. The home monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes security system 457. The security system 457 can be computing devices (e.g., a computer, microcontroller, FPGA, ASIC, or other device capable of electronic computation) capable of receiving data related to the security system and communicating electronically with the monitoring system control unit 410.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, ZigBee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the home monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the home monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system 400 and perform analysis of sensor and image data received from the monitoring system 400. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the security system 457. The one or more user devices 440 and 450 receive data directly from the sensors 420, the home automation controls 422, the camera 430, the robotic devices 490, and the security system 457 and sends data directly to the sensors 420, the home automation controls 422, the camera 430, the robotic devices 490, and the security system 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the security system 457 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, and the security system 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the security system 457 to a pathway over network 405 when the one or more user devices 440 and 450 are farther from the sensors 420, the home automation controls 422, the camera 430, the thermostat 434, the robotic devices 490, and the security system 457. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the security system 457 to use the direct local pathway or whether the one or more user devices 440 and 450 are far enough from the sensors 420, the home automation controls 422, the camera 430, the thermostat 434, the robotic devices 490, and the security system 457 that the pathway over network 405 is required. In other examples, the system leverages status communications (e.g., pinging) between the one or more user devices 440 and 450 and the sensors 420, the home automation controls 422, the camera 430, the thermostat 434, the robotic devices 490, and the security system 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the security system 457 using the direct local pathway. If communication using the direct local pathway is not possible, the one or more user devices 440 and 450 communicate with the sensors 420, the home automation controls 422, the camera 430, the thermostat 434, the robotic devices 490, and the security system 457 using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
    detecting, by a security system for a premises, that a person who was within a threshold area for the premises was likely uttering a sound;
    determining, using data from one or more sensors, a likelihood that the person was communicating with the security system at the premises;
    determining whether the likelihood satisfies a threshold likelihood and that the person's voice should not be obfuscated; and
    in response to determining that the likelihood does not satisfy the threshold likelihood and that the person's voice should be obfuscated, obfuscating the person's voice.

2. The method of claim 1, wherein detecting that the person who was within the threshold area for the premises was likely uttering a sound comprises detecting, using video data captured by a camera, an image that depicts the person's lips moving.

3. The method of claim 1, comprising retrieving, from a database for the premises, an audio signal encoding captured when the person was within the threshold area for the premises, wherein detecting that the person was likely uttering a sound comprises detecting that the audio signal likely encodes the voice of the person who was within the threshold area for the premises.

4. The method of claim 1, wherein detecting that the person who was within the threshold area for the premises was likely uttering a sound comprises detecting, using audio data captured by a microphone, an encoding of the person's voice.

5. The method of claim 4, wherein determining the likelihood that the person was communicating with the security system at the premises comprises determining, using the audio data captured by the microphone, the likelihood that the person was communicating with the security system at the premises.

6. The method of claim 5, wherein:
    determining the likelihood that the person was communicating with the security system at the premises comprises determining, using voice recognition, whether a first signature for the person's voice matches a second signature included in a database that includes one or more signatures, each signature of which is for a second person for which there is at least a second threshold likelihood that the second person will be within a second threshold area for the premises; and
    determining whether the likelihood satisfies the threshold likelihood comprises determining that the likelihood does not satisfy the threshold likelihood and that the person's voice should be obfuscated when the first signature matches the second signature.

7. The method of claim 5, wherein:
    determining the likelihood that the person was communicating with the security system at the premises comprises determining, using voice recognition, whether a first signature for the person's voice matches a second signature included in a database that includes one or more anonymized signatures, each signature of which is for a second person for which there is at least a second threshold likelihood that the second person will be within a second threshold area for the premises; and
    determining whether the likelihood satisfies the threshold likelihood comprises determining that the likelihood does not satisfy the threshold likelihood and that the person's voice should be obfuscated when the first signature matches the second signature.

8. The method of claim 1, wherein obfuscating the person's voice comprises removing, from an audio signal captured by a microphone, an encoding of the person's voice.

9. The method of claim 8, comprising maintaining, in the audio signal, an encoding of background noise that is separate from the encoding of the person's voice.

10. The method of claim 1, wherein obfuscating the person's voice comprises determining to skip initiating a recording of the person's voice by a microphone.

11. The method of claim 1, wherein determining the likelihood that the person was communicating with the security system at the premises uses the data from the one or more sensors physically located at the premises.

12. The method of claim 1, wherein determining, using the data from the one or more sensors, the likelihood that the person was communicating with the security system at the premises comprises determining one or more of:
    the likelihood that the person was speaking with a resident of the premises;
    the likelihood that the person spoke within a threshold time of a predetermined environmental sound detected by the security system; or
    the likelihood that the person is an intruder at the premises who likely uttered the sound.

13. A system comprising one or more computers and one or more storage devices on which are stored instructions that are operable, when executed by the one or more computers, to cause the one or more computers to perform operations comprising:
   detecting, by a security system for a premises, that a person who was within a threshold area for the premises was likely uttering a sound;
   determining, using data from one or more sensors, a likelihood that the person was communicating with the security system at the premises;
   determining whether the likelihood satisfies a threshold likelihood and that the person's voice should not be obfuscated; and
   in response to determining that the likelihood satisfies the threshold likelihood and that the person's voice should not be obfuscated, maintaining, in memory, an audio signal i) that encodes the person's voice and ii) was captured by a microphone that was physically located at the premises.

14. The system of claim 13, the operations comprising:
   detecting that the person who was within the threshold area for the premises was likely uttering a second sound;
   determining, using second data from the one or more sensors, a second likelihood that the person was communicating with the security system at the premises by way of the second sound;
   determining whether the second likelihood satisfies the threshold likelihood and that the person's voice for the second sound should not be obfuscated; and
   in response to determining that the second likelihood does not satisfy the threshold likelihood and that the person's voice for the second sound should be obfuscated, obfuscating the person's voice for the second sound.

15. The system of claim 13, wherein detecting that the person who was within the threshold area for the premises was likely uttering a sound comprises detecting, using video data captured by a camera, an image that depicts the person's lips moving.

16. The system of claim 13, the operations comprising retrieving, from a database for the premises, an audio signal encoding captured when the person was within the threshold area for the premises, wherein detecting that the person was likely uttering a sound comprises detecting that the audio signal likely encodes the voice of the person who was within the threshold area for the premises.

17. The system of claim 13, wherein:
   determining the likelihood that the person was communicating with the security system at the premises comprises determining, using voice recognition, whether a first signature for the person's voice matches a second signature included in a database that includes one or more signatures, each signature of which is for a second person for which there is at least a second threshold likelihood that the second person will be within a second threshold area for the premises; and
   determining whether the likelihood satisfies the threshold likelihood comprises determining that the likelihood satisfies the threshold likelihood and that the person's voice should not be obfuscated when the first signature does not match the second signature.

18. The system of claim 13, wherein:
   determining the likelihood that the person was communicating with the security system at the premises comprises determining, using voice recognition, whether a first signature for the person's voice matches a second signature included in a database that includes one or more anonymized signatures, each signature of which is for a second person for which there is at least a second threshold likelihood that the second person will be within a second threshold area for the premises; and
   determining whether the likelihood satisfies the threshold likelihood comprises determining that the likelihood satisfies the threshold likelihood and that the person's voice should not be obfuscated when the first signature does not match the second signature.

19. One or more non-transitory computer storage media encoded with instructions that, when executed by one or more computers, cause the one or more computers to perform operations comprising:
   detecting, by a security system for a premises, that a person who was within a threshold area for the premises was likely uttering a sound;
   determining, using data from one or more sensors, a likelihood that the person was communicating with the security system at the premises;
   determining whether the likelihood satisfies a threshold likelihood and that the person's voice should not be obfuscated; and
   in response to determining that the likelihood does not satisfy the threshold likelihood and that the person's voice should be obfuscated, obfuscating the person's voice.

20. The computer storage media of claim 19, wherein detecting that the person who was within the threshold area for the premises was likely uttering a sound comprises detecting, using video data captured by a camera, an image that depicts the person's lips moving.

* * * * *